(No Model.)
G. HULL.
IMPLEMENT TO CLEAN CULINARY VESSELS.
No. 245,170.  Patented Aug. 2, 1881.
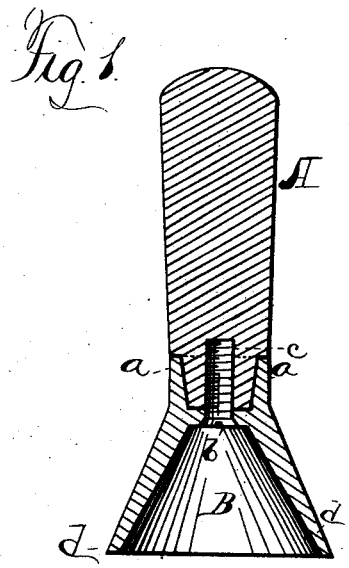
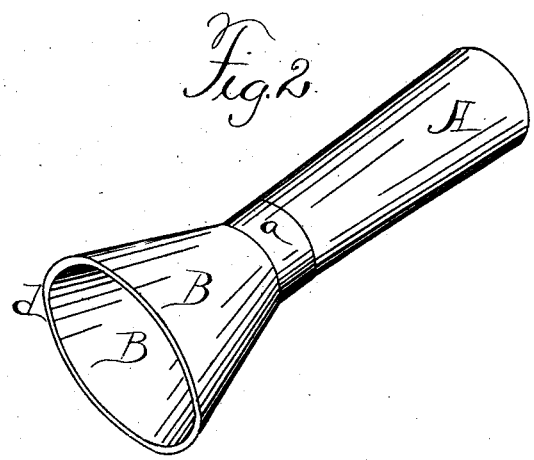
WITNESSES:
T. H. Parsons
J. R. Drake
George Hull
INVENTOR,
BY J. R. Drake
ATTORNEY.

UNITED STATES PATENT OFFICE.

GEORGE HULL, OF BUFFALO, NEW YORK.

IMPLEMENT TO CLEAN CULINARY VESSELS.

SPECIFICATION forming part of Letters Patent No. 245,170, dated August 2, 1881.

Application filed January 8, 1881. (No model.)

*To all whom it may concern:*

Be it known that I, GEORGE HULL, of Buffalo, in the county of Erie and State of New York, a citizen of the United States, have made certain Improvements in Kitchen Implements to Clean Kettles, Pans, Tins, &c., of which the following is a specification.

This invention consists of a cheap and handy little implement to clean off the grease, rust, sediment, dirt, &c., that usually adhere to skillets, kettles, pans, bread-boards, &c.; and the invention consists in its construction, as hereinafter fully explained.

In the drawings, Figure 1 is a vertical cross-section of one-half the device; Fig. 2 a perspective of the whole.

A represents the handle, made either of wood or metal.

B is the metal scraper or cleaner, made somewhat cone-shaped and hollow, with the bottom level so as to set flat as any dish, &c., to be cleaned. A rim, $a$, forms the upper part of the cone B for the handle A to set in, as shown in Fig. 1. A plate, $b$, forming part of the metal scraper, acts as a rest for the end of the handle, and a screw, $c$, goes through this and into the handle to hold the scraper and handle together. This is the entire device. The handle is usually of wood and the scraper of iron. The scraping or cutting edge is the rim $d$. To operate it, it is set flat in the dish to be cleaned, held by the handle A, and moved about with a slight pressure till all the bottom is clean. It thoroughly cuts all the sediment, rust, grease, &c., from all dishes, either hollow, concave, or flat, the peculiar shape and size of the device allowing it to go into all the curves and corners of the dishes, and thus thoroughly clean them. It being hollow, cone, or bell shaped and round, greatly aids this, besides distributing the wear evenly on the cutting-edge $d$, and as it wears down presents a new edge always. It being hollow gives it more cutting or scraping surface, and adapts it specially to concave-bottom dishes. It is intended to take the place of and prevent the ruin of knives now used and broken by servants and others in scraping out dishes, pans, kettles, &c. It is of uniform thickness, and thus wears even.

I claim—

The combination of the handle A and hollow round metal scraper B, connected together, substantially as hereinbefore specified.

In witness whereof I have hereunto signed my name in the presence of two subscribing witnesses.

GEORGE HULL.

Witnesses:
J. R. DRAKE,
GEO. A. BURNETT.